(12) United States Patent
Liu et al.

(10) Patent No.: US 8,737,771 B2
(45) Date of Patent: May 27, 2014

(54) ANNOTATION ADDITION METHOD, ANNOTATION ADDITION SYSTEM USING THE SAME, AND MACHINE-READABLE MEDIUM

(75) Inventors: Yuan Liu, Beijing (CN); Tao Li, Beijing (CN); Yinghui Xu, Kanagawa (JP); Yi Chen, Beijing (CN); Lei Zhang, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 358 days.

(21) Appl. No.: 13/005,062

(22) Filed: Jan. 12, 2011

(65) Prior Publication Data

US 2011/0229017 A1    Sep. 22, 2011

(30) Foreign Application Priority Data

Mar. 18, 2010   (CN) .......................... 2010 1 0127016

(51) Int. Cl.
| | |
|---|---|
| *G06K 9/60* | (2006.01) |
| *G06K 9/62* | (2006.01) |
| *G06K 9/46* | (2006.01) |
| *G06K 9/66* | (2006.01) |
| *G06F 17/00* | (2006.01) |

(52) U.S. Cl.
USPC ........... 382/305; 382/159; 382/190; 382/195; 715/268; 715/233

(58) Field of Classification Search
None
See application file for complete search history.

(56) References Cited

U.S. PATENT DOCUMENTS

| | | |
|---|---|---|
| 2008/0229191 A1 | 9/2008 | Bates et al. |
| 2008/0229192 A1 | 9/2008 | Gear et al. |
| 2009/0289942 A1 | 11/2009 | Bailloeul et al. |
| 2010/0048242 A1* | 2/2010 | Rhoads et al. ............. 455/556.1 |
| 2011/0047163 A1* | 2/2011 | Chechik et al. ............... 707/741 |

OTHER PUBLICATIONS

Sigurbjrnsson and Zwol, Apr. 25, 2008, Proceeding of the 17th international Conference on World Wide Web, pp. 327-336.*
Combined Chinese Office Action and Search Report issued Nov. 27, 2012, in Patent Application No. 201010127016.0 (with English-language translation).
Börkur Sigurbjörnsson, et al., "Flickr Tag Recommendation based on Collective Knowledge", WWW 2008/Refereed Track: Rich Media, Apr. 21-25, 2008, pp. 327-336.

* cited by examiner

*Primary Examiner* — Amir Alavi
*Assistant Examiner* — Kenny Cese
(74) *Attorney, Agent, or Firm* — Oblon, Spivak, McClelland, Maier & Neustadt, L.L.P.

(57) ABSTRACT

Disclosed are a method and a system for adding annotations into an input medium file. The method comprises a step of creating annotation detection models based on training samples formed by existing media files having annotations; a step of extracting coexistence coefficients of any two annotations based on appearance frequencies of the annotations in the training samples; a step of inputting the input medium file; a step of extracting sense-of-vision features from the input medium file; a step of obtaining initial annotations of the input medium file; a step of acquiring candidate annotations based on the initial annotations and the coexistence coefficients of the annotations in the training samples; and a step of selecting a final annotation set from the candidate annotations based on the sense-of-vision features of the input medium file and the coexistence coefficients by using the annotation detection models.

11 Claims, 4 Drawing Sheets

ANNOTATION ADDITION METHOD, ANNOTATION ADDITION SYSTEM USING THE SAME, AND MACHINE-READABLE MEDIUM

BACKGROUND OF THE INVENTION

1. Field of the Invention

The present invention relates to an annotation addition method, an annotation addition system using the annotation addition method, and a machine-readable medium, and more particularly relates to an annotation addition method and an annotation addition system for adding one or more annotations into an input medium file as well as a machine-readable medium having machine-executable instructions for realizing the annotation addition method.

2. Description of the Related Art

With the popularization of digital techniques, a large amount of media files such as audio files, video files, image files, text files, a combination of them, etc., have been created so far. The appearance of lots of audio and video files is convenient for people to vividly record and store various information items. However, as the amount of these kinds of media files increases, it has become a problem how a user can quickly find his desired file in these kinds of media files. In order to solve this problem, a method of adding one or more text annotations into a medium file is proposed; by using the text annotations, the content of the medium file can be described. In this way, the user can seek various media files by using the text annotations. This method of adding the text annotations into the medium file is called "medium file annotation addition method". In other words, this method is adding key words (also called annotations) into an image, an audio segment, a video segment, etc. These kinds of annotations may be applied to various subsequent media-file-related applications, for example, multi-media management, multi-media retrieval, copyright protection, object recognition, etc.

A conventional medium file annotation addition method adopts human power to add one or more annotations into a medium file; it is apparent that the conventional medium file annotation addition method costs a great amount of time and work. When facing the media files increasing in amount day by day, it is hard or even impossible to add one or more annotations into each of the media files only by using the human power. As a result, the inventors of US Patent Application Publication No. 2008/0229192 propose a method of adding at least one tag into an image based on human-computer interaction. In this patent application, at least one ink annotation is considered as a beginning, then handwriting recognition processing is performed based on the ink annotation, and then the recognition result is used for generating at least one tag associated with the image file. However, in practice, most of media files, for example, audio files or video files do not include the ink annotation; therefore, as for the media files without the ink annotation, the technique disclosed in this patent application cannot generate any tag.

U.S. Patent Application No. 2009/0289942 discloses an automatic annotation addition method of automatically adding one or more annotations into an image. In this method, first an annotation dictionary is created, then lots of training samples are collected based on the annotation dictionary, and then a graph model with regard to the annotations existing in the annotation dictionary is created. Next an annotation model is created by applying iterative processing to the graph model; the annotation model can automatically add one or more annotations into the image. However, the biggest drawback of the technical proposal in this patent application is that only a content-limited annotation dictionary can be handled. That is, as for a new input image, if the annotation included in the new input image does not exist in the annotation dictionary, there is not any output annotation, i.e., the annotation processing fails. Furthermore this method needs to be performed in a fully automatic way. That is, a priori knowledge cannot be transmitted to the system by a user in the annotation process, i.e. the priori knowledge is wasted.

SUMMARY OF THE INVENTION

In order to overcome the disadvantages of the prior art, the present invention provides an annotation addition method and an annotation addition system for adding one or more annotations into an input medium file. By using the annotation addition method and the annotation addition system in the embodiments of the present invention, it is possible to choose one or more proper text annotations for the input medium file by a fully automatic way or a semi-automatic way with a small amount of artificial intelligence so that the content of the input medium file can be described by the text annotations; the text annotations may be applied to various subsequent medium-file-related applications, for example, medium file retrieval, medium file management, etc.

According to one aspect of the present invention, an annotation addition method of adding one or more annotations into an input medium file is provided. The annotation addition method comprises an annotation detection model creation step of creating one or more annotation detection models based on one or more training samples formed by one or more existing media files having one or more annotations; an annotation coexistence coefficient extraction step of extracting one or more coexistence coefficients of any two annotations based on appearance frequencies of the annotations in the training samples; a medium file input step of inputting the input medium file; a sense-of-vision feature extraction step of extracting one or more sense-of-vision features from the input medium file; an initial annotation obtaining step of obtaining one or more initial annotations of the input medium file; a candidate annotation acquiring step of acquiring one or more candidate annotations based on the initial annotations and the coexistence coefficients of the annotations in the training samples; and a final annotation set selection step of selecting a final annotation set suitable for describing content of the input medium file from the candidate annotations based on the sense-of-vision features of the input medium file and the coexistence coefficients by using the annotation detection models.

According to the annotation addition method, the annotation detection model creation step includes a step of forming an annotation dictionary based on the training samples, then collecting one or more training samples belonging to the respective annotations in the annotation dictionary, and then extracting one or more sense-of-vision features of the collected training samples; and a step of creating the annotation detection models with regard to the annotations base on the collected training samples and the sense-of-vision features of the training samples; wherein, each of the created annotation detection models gives existence probability of the corresponding annotation in one existing medium file.

According to the annotation addition method, the annotation coexistence coefficient extraction step includes a step of calculating, with regard to all the training samples, the amounts of any two annotations existing in the same existing medium file so as to determine coexistence frequencies of any two annotations; a step of calculating, with regard to all the training samples, the amounts of the existing media files including the two annotations and one of the two annotations, or the amounts of the existing media files including one of the two annotations; and a step of, based on the calculated amounts of the existing media files, acquiring the annotation coexistence coefficients of any two annotations.

According to the annotation addition method, the initial annotation obtaining step is achieved by carrying out one of approaches of: letting a user voluntarily input the initial annotations; automatically extracting the annotations carried by the input medium file itself; automatically extracting other information carried by the input medium file itself and converting it into an annotation format; and utilizing other information carried by the input medium file itself so as to acquire the initial annotations from a third party.

According to the annotation addition method, the sense-of-vision features comprise but are not limited to low level features including color, texture, edge directions of the input medium file, etc; and high level features including creation environment, creation time, etc., of the input medium file.

According to the annotation addition method, the final annotation set selection step includes a step of acquiring, based on the created annotation detection models, degrees of confidence of existence of the respective candidate annotations with regard to the input medium file; a step of acquiring, based on the coexistence coefficients of the candidate annotations, a coexistence coefficient matrix of the candidate annotations, wherein, the dimensions of the coexistence coefficient matrix are equal to the number of the candidate annotations; a step of calculating, based on the degrees of confidence of existence of the candidate annotations and the coexistence coefficient matrix of the candidate annotations, existence scores of the respective candidate annotations with regard to the input medium file, wherein, the higher the existence score is, the more accurately the corresponding candidate annotation describes the content of the input medium file; a step of ranking, based on the existence scores of the respective candidate annotations, the existence scores of the respective candidate annotations; and a step of selecting, based on the ranked result, one or more candidate annotations suitable for describing the content of the input medium file to form the final annotation set.

According to the annotation addition method, the candidate annotation acquiring step includes, in a case where the number of the initial annotations is plural, a step of acquiring candidate annotation lists corresponding to the respective initial annotations; and a step of selecting one or more final candidate annotation lists able to describe the content of the input medium file from the candidate annotation lists, including a step of acquiring, by using the annotation detection models, degree of confidence of existence of each of candidate annotations in each of the candidate annotation lists with regard to the input medium file; a step of acquiring, based on coexistence coefficients of the candidate annotations in each of the candidate annotation lists, a coexistence coefficient matrix of the candidate annotations in the corresponding candidate annotation list, wherein, the dimensions of the coexistence coefficient matrix are equal to the number of the candidate annotations in the corresponding candidate annotation list; a step of calculating, based on the degree of confidence of existence of each of the candidate annotations in the corresponding candidate list and the coexistence coefficient matrix of the candidate annotations in the corresponding candidate annotation list, existence scores of the respective annotations in the corresponding candidate list with regard to the input medium file, and then, by totaling the existence scores of the respective annotations in the corresponding candidate list with regard to the input medium file, acquiring a combined existence score of the corresponding candidate annotation list, wherein, the higher the combined existence score is, the more accurately the corresponding candidate annotation list describes the content of the input medium file; a step of ranking, based on the combined existence scores of the candidate annotation lists, the combined existence scores of the candidate annotation lists; and a step of selecting, based on the ranked result, one or more final candidate annotation lists able to describe the content of the input medium file.

According to another aspect of the present invention, an annotation addition system for adding one or more annotations into an input medium file is provided. The annotation addition system comprises an annotation detection model creation module configured to create one or more annotation detection models based on one or more training samples formed by one or more existing media files having one or more annotations; an annotation coexistence coefficient extraction module configured to extract one or more coexistence coefficients of any two annotations based on appearance frequencies of the annotations in the training samples; a medium file input module configured to input the input medium file; a sense-of-vision feature extraction module configured to extract one or more sense-of-vision features from the input medium file; an initial annotation obtaining module configured to obtain one or more initial annotations of the input medium file; a candidate annotation acquiring module configured to acquire one or more candidate annotations based on the initial annotations and the coexistence coefficients of the annotations in the training samples; and a final annotation set selection module configured to select a final annotation set suitable for describing content of the input medium file from the candidate annotations based on the sense-of-vision features of the input medium file and the coexistence coefficients by using the annotation detection models.

According to the annotation addition system, the final annotation set selection module includes a module configured to acquire, by using the created annotation detection models, degrees of confidence of existence of the respective candidate annotations with regard to the input medium file; a module configured to acquire, based on the coexistence coefficients of the candidate annotations, a coexistence coefficient matrix of the candidate annotations, wherein, the dimensions of the coexistence coefficient matrix are equal to the number of the candidate annotations; a module configure to calculate, based on the degrees of confidence of existence of the candidate annotations and the coexistence coefficient matrix of the candidate annotations, existence scores of the respective candidate annotations with regard to the input medium file, wherein, the higher the existence score is, the more accurately the corresponding candidate annotation describes the content of the input medium file; a module configured to rank, based on the existence scores of the respective candidate annotations, the existence scores of the candidate annotations; and a module configured to select, based on the ranked result, one or more candidate annotations suitable for describing the content of the input medium file to form the final annotation set.

According to the annotation addition system, the candidate annotation acquiring module includes, in case of where the number of the initial annotations is plural, a module configured to acquire candidate annotation lists corresponding to the respective initial annotations; and a module of selecting one or more final candidate annotation lists able to describe the content of the input medium file from the candidate annotation lists, including a module configured to acquire, by using the annotation detection models, degree of confidence of existence of each of candidate annotations in each of the candidate annotation lists with regard to the input medium file; a module configured to acquire, based on coexistence coefficients of the candidate annotations in each of the candidate annotation lists, a coexistence coefficient matrix of the candidate annotations in the corresponding candidate annotation list, wherein, the dimensions of the coexistence coefficient matrix are equal to the number of the candidate annotations in the corresponding candidate annotation list; a module configured to calculate, based on the degree of confidence of existence of each of the candidate annotations in the corresponding candidate list and the coexistence coefficient matrix of the candidate annotations in the corresponding candidate annotation list, existence scores of the respective annotations in the corresponding candidate list with regard to the input medium file, and then, by totaling the existence scores of the respective annotations in the corresponding candidate list with regard to the input medium file, acquire a combined existence score of the corresponding candidate annotation list, wherein, the higher the combined existence score is, the more accurately the corresponding candidate annotation list describes the content of the input medium file; a module configured to rank, based on the combined existence scores of the candidate annotation lists, the combined existence scores of the candidate annotation lists; and a module configured to select, based on the ranked result, one or more final candidate annotation lists able to describe the content of the input medium file.

According to still another aspect of the present invention, a non-transitory machine-readable medium having machine-executable instructions for execution by a processing system is provided. The machine-executable instructions are used for adding one or more annotations into an input medium file, and the machine-executable instructions, when executed, cause the processing system to carry out an annotation detection model creation step of creating one or more annotation detection models based on one or more training samples formed by one or more existing media files having one or more annotations; an annotation coexistence coefficient extraction step of extracting one or more coexistence coefficients of any two annotations based on appearance frequencies of the annotations in the training samples; a medium file input step of inputting the input medium file; a sense-of-vision feature extraction step of extracting one or more sense-of-vision features from the input medium file; an initial annotation obtaining step of obtaining one or more initial annotations of the input medium file; a candidate annotation acquiring step of acquiring one or more candidate annotations based on the initial annotations and the coexistence coefficients of the annotations in the training samples; and a final annotation set selection step of selecting a final annotation set suitable for describing content of the input medium file from the candidate annotations based on the sense-of-vision features of the input medium file and the coexistence coefficients by using the annotation detection models.

According to the annotation addition method and the annotation addition system, the media files (i.e. the existing media files and the input medium file) may include an image file, an audio file, a video file, etc.

According to the annotation addition system, when the input medium file is input, a prompt for prompting a user to input one or more annotations (i.e. initial annotations) is provided. If the user makes a response, i.e., if the user inputs one or more initial annotations, the annotation addition system may more effectively carry out processing based on the input initial annotations; if the user does not make a response, i.e., if the user does not input one or more initial annotations, the annotation addition system may carry out processing by using an automatic initial annotation creation approach. Since the technical proposal according the embodiments of the invention can obtain the initial annotations via the user, the priori knowledge of the user can be sufficiently employed.

If the user provides one initial annotation for the input medium file, or the annotation addition system automatically generates one initial annotation for the input medium file, then the annotation addition system may acquire, based on the preliminarily calculated annotation coexistence coefficients, one or more candidate annotations with regard to the initial annotations. Then, based on the sense-of-vision features of the input media files, the existence scores of the candidate annotations with regard to the input medium file are calculated, and then the candidate annotation are ranked based on the existence scores.

If the user provides plural initial annotations for the input medium file, or the annotation addition system automatically generates plural initial annotations for the input medium file, then the annotation addition system may carry out the above-mentioned steps with regard to each of the plural initial annotations so as to acquire one or more candidate annotation lists including one or more candidate annotations. However, here, it should be noted that all the candidate annotation lists are employed for calculating the combined existence scores, and then a candidate annotation list having the highest combined existence score may be considered the final candidate annotation list.

DETAILED DESCRIPTION OF THE PREFERRED EMBODIMENTS

Hereinafter, the embodiments of the present invention will be concretely described with reference to the drawings.

Figure 1:
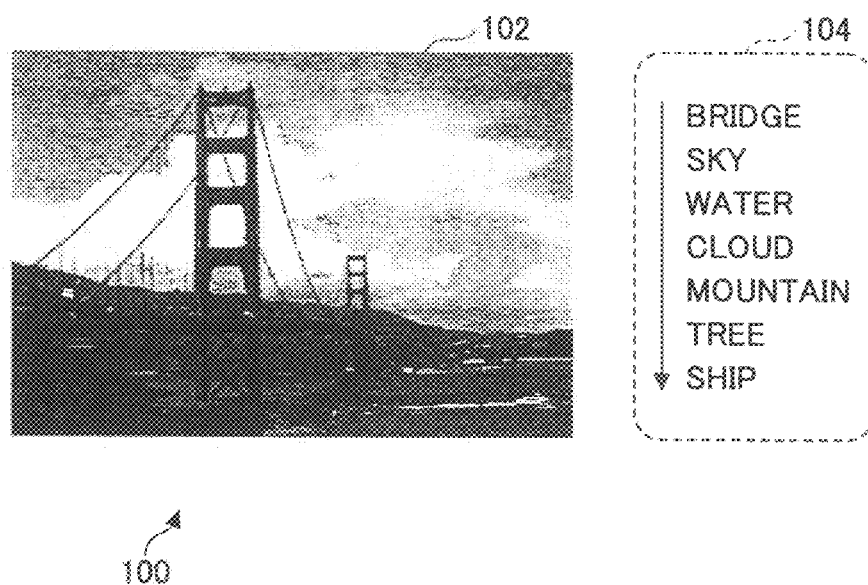
FIG. 1 illustrates an example of a training sample.

FIG. 1 illustrates an example of a training sample. In FIG. 1, a training sample 100 includes an image 102 and a ranked annotation list 104. As shown in FIG. 1, one existing medium file (i.e. the image 102) corresponds to one annotation list (i.e. the ranked annotation list 104); in this way, one training sample (i.e. the training sample 100) is generated. Similarly one annotation may correspond to plural existing media files, i.e., one annotation may correspond to an existing medium file list; this kind of correspondence relationship may also form one training sample. Then these kinds of training samples form a training sample set mentioned in the present specification. In general, the training samples are created by using an artificial annotation addition approach, or existing media files including annotations in one or more websites may be collected as the training samples. Each of these existing media files may be represented by various sense-of-vision features including but not limited to features of texture description based on Local Binary Pattern (LBP), features of block-wise color moments in LAB color space, features of edge direction histograms, sub features of Fourier description, etc.; in this way, a sense-of-vision feature space of the training sample set is generated. In other words, the sense-of-vision features may comprise low level features such as color, texture, edge directions, etc., of the existing media files and high level features such as creation environment, creation time, etc., of the existing media files. Here it should be noted that since calculation approaches of calculating the sense-of-vision features are known by those skilled in the art, they are omitted in the present specification.

Figure 2:
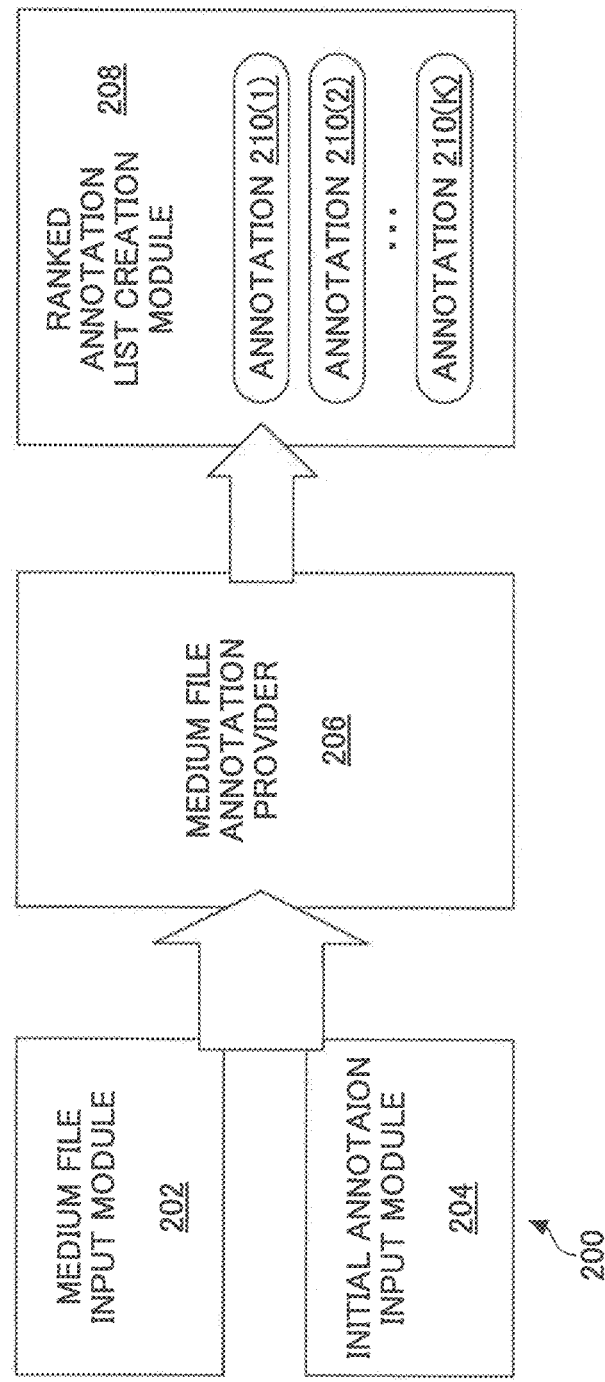
FIG. 2 is a block diagram of an annotation addition system for adding one or more annotations into an input medium file according to an embodiment of the present invention.

FIG. 2 is a block diagram of an annotation addition system for adding one or more annotations into an input medium file according to an embodiment of the present invention.

As shown in FIG. 2, an annotation addition system 200 includes a medium file input module 202 used for inputting an input medium file; an initial annotation input module 204 used for inputting one or more initial annotations; a medium file annotation provider 206 used for outputting one or more annotations; and an annotation list creation module 208 used for creating a ranked annotation list including one or more annotations 210. In particular, in the created ranked annotation list, there are K annotations i.e. 210(1), 210(2), . . . , 210(K); here K is a positive integer. It should be noted that since the structure of the created ranked annotation list is similar to that of the ranked annotation list 104 corresponding to the image 102 shown in FIG. 1, it is omitted in the present specification.

Figure 3:
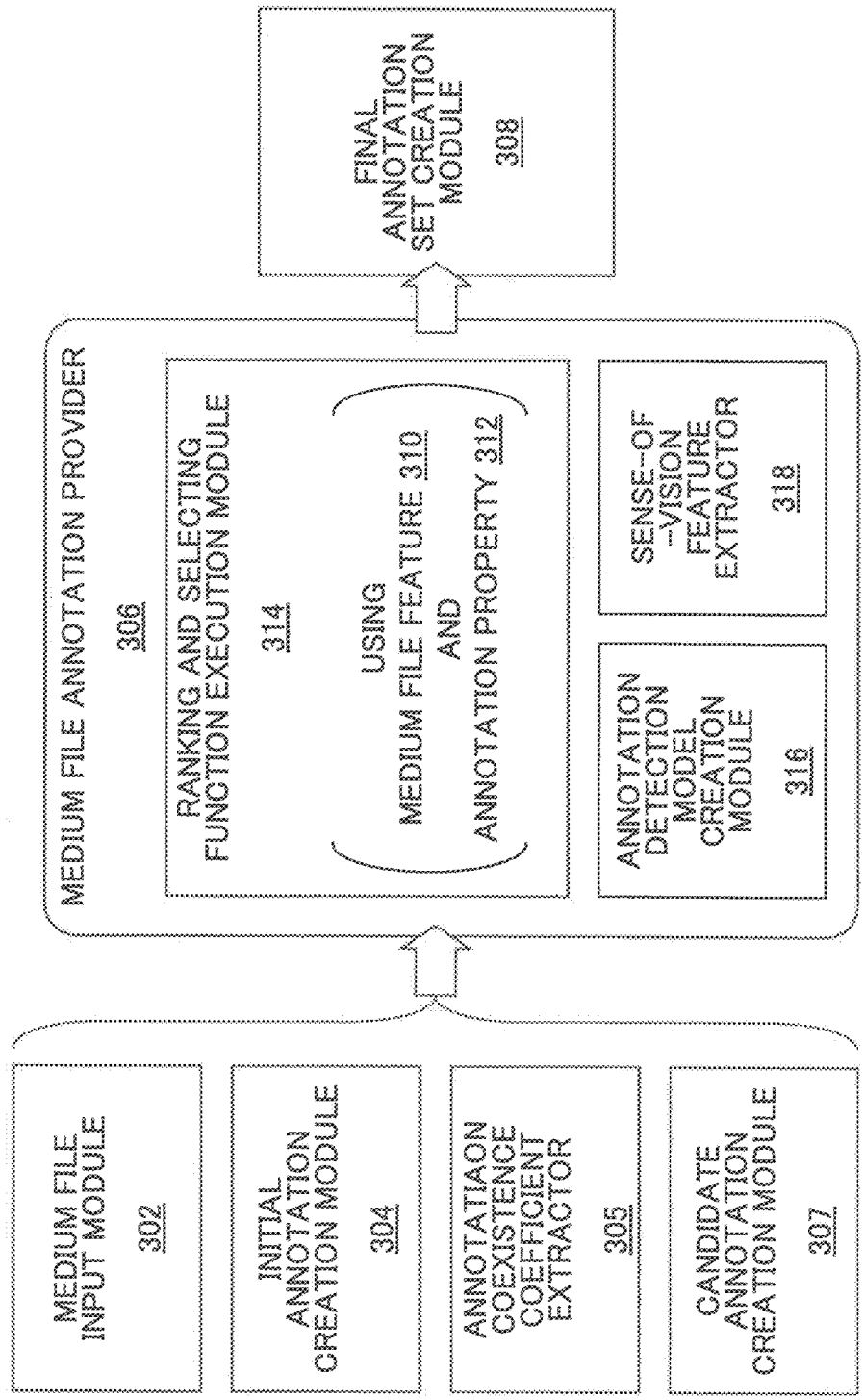
FIG. 3 is a block diagram of an annotation addition system for adding one or more annotations into an input medium file according to an embodiment of the present invention.

FIG. 3 is a block diagram of an annotation addition system for adding one or more annotations into an input medium file according to an embodiment of the present invention.

As shown in FIG. 3, an annotation addition system 300 includes a medium file input module 302 used for inputting the input medium file; an initial annotation creation module 304 used for creating one or more initial annotations; an annotation coexistence coefficient extractor 305 used for extracting one or more annotation coexistence coefficients; a candidate annotation creation module 307 used for creating one or more candidate annotations; a medium file annotation provider 306 used for outputting one or more candidate annotations suitable for describing the content of the input medium file; and a final annotation set creation module 308 used for creating a final annotation set suitable for describing the content of the input medium file. The medium file annotation provider 306 includes a ranking and selecting function execution module 314 used for executing a ranking and selecting function; an annotation detection model creation module 316 used for creating one or more annotation detection models; and a sense-of-vision feature extractor 318 used for extracting one or more sense-of-vision features. The ranking and selecting function execution module 314 may use one or more medium file features 310 and one or more annotation properties 312 when executing the ranking-and-selecting function.

The annotation detection model creation module 316 creates one or more annotation detection models based on one or more training samples formed by one or more existing media files having one or more annotations. In general, the training samples are created by using an artificial annotation addition approach, or one or more existing media files including one or more annotations in one or more websites may be collected as the training samples. In particular, an annotation dictionary is generated based on the training samples, and then the training samples belonging to the respective annotations in the annotation dictionary are collected. Then the sense-of-vision feature extractor 318 extracts one or more sense-of-vision features from the training samples, and then transmits the extracted sense-of-vision features to the annotation detection model creation module 316. As an example, the annotation detection models may be created by using a Support Vector Machine (SVM) based on the extracted sense-of-vision features from the training samples; each of the created annotation detection models gives an existence probability of the corresponding annotation in one existing medium file. It should be noted that since the approach of creating the annotation detection models by using the Support Vector Machine (SVM) is known by those practiced in the art, it is omitted in the present specification.

At the same time, the annotation coexistence coefficient extractor 305 extracts one or more annotation coexistence coefficients of any two annotations based on the existence probabilities of the annotations in the training samples; here the annotation coexistence coefficients are the annotation properties 312. In particular, the process of obtaining the annotation coexistence coefficients carried out by the annotation coexistence coefficient extractor 305 is as follows: first, with regard to all the training samples, the number of any two annotations existing in the same existing medium file is calculated so as to determine coexistence frequencies of the any two annotations; then, with regard to all the training samples, the number of the existing media files including the two annotations or one of the two annotations is calculated, or the number of the existing media files including one of the two annotations is calculated; finally, based on the calculated numbers of annotations of the existing media files, the annotation coexistence coefficients of any two annotations are acquired. Here it should be noted that the annotation coexistence coefficients may be acquired by using the below-mentioned equations (1)-(4).

Aside from extracting the sense-of-vision features from the training samples when the annotation detection model creation module 316 creates the annotation detection models, the sense-of-vision feature extractor 318 may also extract one or more sense-of-vision features from the input medium file after the input medium file is input so as to acquire the medium file features 310.

The initial annotation creation module 304 obtains the initial annotations of the input medium file. There are various approaches to obtain the initial annotations. For example, it is possible to let a user voluntarily input the initial annotations; in a case where the input medium file itself carries one or more annotations, it is possible to automatically extract the annotations carried by the input medium file itself, or it is possible to automatically extract other information (for example, the file name of the input medium file, the creation time of the input medium file, the character information occurring on a screen when executing the input medium file, etc.) carried by the input medium file itself and convert it into an annotation format. Or it is possible to utilize other information (for example, a website link, a sense-of-vision feature, etc.) carried by the input medium file itself for acquiring the initial annotations from a third party. However, these kinds of annotations are too coarse in general; as a result, it is impossible to accurately describe the content of the input medium file by using these kinds of annotations.

Consequently, in order to create more accurate annotations for the input medium file, it is necessary to create the more accurate annotations based on the initial annotations. For this purpose, the candidate annotation creation module 307 acquires one or more candidate annotations with regard to the input medium file based on the initial annotations of the input medium file obtained by the initial annotation creation module 304 and the annotation coexistence coefficients extracted by the annotation coexistence coefficient extractor 305. In particular, annotations having coexistence relationships to the initial annotations in all the annotations of the training sample set are selected as the candidate annotations. In a circumstance where there are plural initial annotations, as for each of the initial annotations, the candidate annotation creation module 307 creates the corresponding candidate annotation list, i.e., one initial annotation corresponds to one candidate annotation list.

However, in general, the number of the candidate annotations is large. If the content of the input medium file is described by directly using these candidate annotations, it is also impossible to get an accurate result when carrying out a subsequent annotation-based retrieval to search for a medium file. As a result, it is necessary to accurately select proper ones from the candidate annotations.

In order to do this, it is necessary to rank the candidate annotations on some level so as to select, from the candidate annotations, a final annotation set which is more suitable for describing the content of the input medium file.

For this purpose, two approaches of selecting, from the candidate annotations, one or more candidate annotations which are suitable for describing the content of the input medium file by using the annotation detection models according to the sense-of-vision features of the input medium file and the coexistence coefficients of the candidate annotations are given in what follows. It should be noted that, since, of course, there are also other approaches aside from the below-mentioned two selection approaches, those are omitted in the present specification.

One approach is that, in a case where there is one initial annotation, the ranking and selecting function execution module 314 ranks all the candidate annotations corresponding to the initial annotation. The ranking and selecting function execution module 314 executes steps of acquiring, based on the created annotation detection models created by the annotation detection model creation module 316, degrees of confidence of existence of the respective candidate annotations with regard to the input medium file; acquiring, based on the coexistence coefficients of the candidate annotations, a coexistence coefficient matrix of the candidate annotations, wherein, the dimensions of the coexistence coefficient matrix are equal to the number of the candidate annotations; calculating, based on the degrees of confidence of existence of the candidate annotations and the coexistence coefficient matrix of the candidate annotations, an existence score of each of the candidate annotations with regard to the input medium file, wherein, the higher the existence score is, the more accurately the corresponding candidate annotation can describe the content of the input medium file (the calculation approach of calculating the existence score will be illustrated below); ranking, based on the existence score of each of the candidate annotations, the existence scores of the respective candidate annotations; selecting, based on the ranked result, one or more candidate annotations suitable for describing the content of the input medium file.

Another approach is that, in a case where there are plural initial annotations, the ranking and selecting function execution module 314 may select one or more candidate annotation lists by ranking the candidate annotation lists corresponding to the initial annotations. The ranking and selecting function execution module 314 executes steps of acquiring the degree of confidence of existence of each of the candidate annotations in each of the candidate annotation lists corresponding to the initial annotations with regard to the input medium file by using the created annotation detection models; acquiring, based on the coexistence coefficients of the candidate annotations in each of the candidate annotation lists, a coexistence coefficient matrix of the candidate annotations in the corresponding candidate annotation list, wherein, the dimensions of the coexistence coefficient matrix are equal to the number of the candidate annotations in the corresponding candidate annotation list; calculating, based on the degree of confidence of existence of each of the candidate annotations and the coexistence coefficient matrix of the candidate annotations in the corresponding candidate annotation list, an existence score of each of the candidate annotations in the corresponding candidate annotation list with regard to the input medium file; acquiring, by totaling the existence scores of the respective candidate annotations in the corresponding candidate annotation list with regard to the input medium file, a combined existence score of the corresponding candidate annotation list, wherein, the higher the combined existence score is, the more accurately the corresponding candidate annotation list can describe the content of the input medium file; ranking, based on the combined existence scores of the candidate annotation lists, the combined existence scores of the candidate annotation lists; selecting, based on the ranked result, one or more candidate annotation lists suitable for describing the content of the input medium file.

Finally the medium file annotation provider 306 outputs the ranked and selected one or more candidate annotations (or one or more candidate annotation lists) to the final annotation set creation module 308, and then the final annotation set creation module 308 creates a final annotation set suitable for describing the content of the input medium file.

Figure 4:
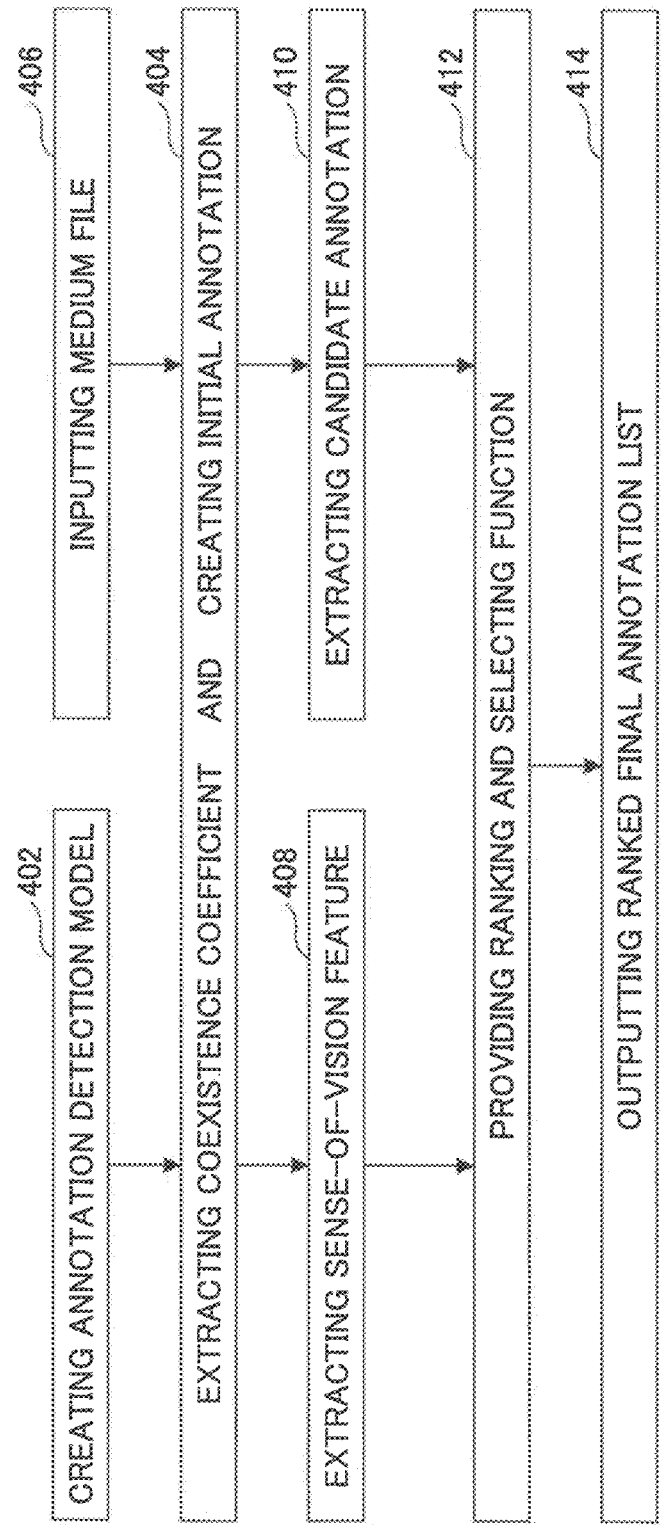
FIG. 4 is a flowchart of an annotation addition method of adding one or more annotations into an input medium file according to an embodiment of the present invention.

FIG. 4 is a flowchart of an annotation addition method of adding one or more annotations into an input medium file according to an embodiment of the present invention. The annotation addition method can be used in the above-mentioned annotation addition system 200 or 300.

As shown in FIG. 4, a flowchart 400 includes STEPS 402-414. In STEP 402, one or more annotation detection models are created. In STEP 404, one or more coexistence coefficients of any two annotations are extracted. The annotation detection models may be created as follows: first a training sample set is obtained with regard to one or more annotations (or one or more annotation lists), and then one or more sense-of-vision features of the training samples in the training sample set are extracted; next the annotation detection models are created by using Support Vector Machine (SVM), and then the coexistence coefficients of any two annotations are extracted based on the frequencies of the annotations occurring in the training samples.

In STEP 406, an input medium file is input; in STEP 404, one or more initial annotations are created. In STEP 404, a user can input the initial annotations, or if the user does not input the initial annotations, the initial annotations may be automatically created by, for example, one of the follow approaches: (1) it is possible to automatically extract one or more annotations carried by the input medium file itself, (2) it is possible to automatically extract other information carried by the input medium file itself and convert it into an annotation format, and (3) it is possible to utilize other information carried by the input medium file itself to acquire the initial annotations from a third party, wherein, for example, it is possible to search for one or more similar media files having one or more annotations in one or more websites and extract the annotation information of the similar medium file.

In STEP 408, one or more sense-of-vision features of the input medium file are extracted. In STEP 410, one or more candidate annotations (or one or more candidate annotation lists) are acquired based on initial annotations created in STEP 404.

It should be noted that the coexistence coefficients may be obtained according to the coexistence times of any two annotations in the training sample set and normalization processing. As an example, the coexistence coefficients may be calculated by the following equation (1).

$$o(t_i, t_j) = \frac{|t_i \cap t_j|}{|t_i \cup t_j|} \quad (1)$$

Here $t_i$ and $t_j$ refer to any two annotations, |•| refers to the size of a set, and ∩ and ∪ refer to the product of two sets and the union of two sets, respectively.

Again, as an example, the coexistence coefficients may be calculated by the following equation (2).

$$o(t_i, t_j) = \frac{|t_i \cap t_j|}{|t_i| + |t_j|} \quad (2)$$

Furthermore, as an example, the coexistence coefficients may be calculated by the following equation (3) or equation (4) if an asymmetric measure is considered.

$$o(t_i, t_j) = \frac{|t_i \cap t_j|}{|t_i|} \quad (3)$$

$$o(t_i, t_j) = \frac{|t_i \cap t_j|}{|t_j|} \quad (4)$$

In STEP 412, a ranking and selecting function is provided for ranking and selecting the candidate annotations (or the candidate annotation lists) so as to output the ranked and selected candidate annotations (or the ranked and selected annotation lists). In STEP 414, a final annotation set is created based on the output result of STEP 412.

For example, the above-mentioned ranking and selecting function execution module 314 may be used to estimate and rank the candidate annotations by using the medium file features 310 and the annotation properties 312. In particular, a kind of annotation graph may be used to find the final annotation set. Here a relationship diagram (V,E) is considered; V is a vertex set corresponding to N annotations, and E is an edge set weighted by the coexistence coefficients. $s=[s_0, s_1, \ldots, s_{N-1}]^T$ is adopted to refer to an annotation existence score vector; each element $s_i$ in the annotation existence score vector refers to the existence score of the annotation $t_i$ with regard to a given medium file (i.e. the input medium file). $d=[d_0, d_1, \ldots, d_{N-1}]^T$ is adopted to refer to an annotation degree-of-confidence vector; each element $d_i$ refers to the degree of confidence of the annotation $t_i$ with regard to the given medium file obtained from the corresponding annotation detection model. It should be noted that if there is not an annotation detection model corresponding to the annotation $t_i$, $d_i$ is set to $d_i=0.5$. Furthermore $\rho$ is a harmonious parameter, and $W_{N\times N}\{\omega_{ij}\}$ refers to a coexistence coefficient matrix in which each element $\omega_{ij}$ refers to a coexistence coefficient of two annotations $t_i$ and $t_j (i \neq j)$, and $\omega_{ii}=0$. As a result, a normalized framework may be expressed as the following minimization of an energy function by using the following equation (5).

$$C(s) = \frac{1}{2}\left(\sum_{i,j=0}^{N-1} \omega_{ij}\left(\frac{s_i}{\sqrt{u_{ii}}} - \frac{s_j}{\sqrt{u_{jj}}}\right)^2 + \rho\sum_{i=0}^{N-1}(s_i - d_i)^2\right) \quad (5)$$

Here $U_{N\times N}\{u_{ij}\}$ is a diagonal matrix in which the i-th and j-th element refers to the sum of the i-th elements in the coexistence coefficient matrix $W_{N\times N}$.

Then a prediction function of the existence scores is as follows.

$$s^* = \arg\min_s C(s) \quad (6)$$

By carrying out differential processing of C(s) with regard to s, the following equation (7) can be obtained.

$$\frac{\partial C}{\partial s}\bigg|_{s=s^*} = s^* - Vs^* + \rho(s^* - d) = 0 \quad (7)$$

Here $$V = U^{-\frac{1}{2}}WU^{-\frac{1}{2}}.$$

The above equation can be transformed to the following equation (8).

$$s^* - \frac{1}{1+\rho}Vs^* - \frac{\rho}{1+\rho}d = 0 \quad (8)$$

If $$\frac{1}{1+\rho} \text{ and } \frac{\rho}{1+\rho}$$

are expressed as $$\frac{1}{1+\rho} = \alpha \text{ and } \frac{\rho}{1+\rho} = \beta,$$

respectively, then the equation (8) can be rewritten to $(1-\alpha V)s^* = \beta d$. Furthermore since $(1-\alpha V)$ is invertible, the following equation (9) can be obtained.

$$s^* = \beta(1-\alpha V)^{-1}d \quad (9)$$

In order to acquire the final annotation set, it is possible to rank the elements in $s^*$ and then let one or more annotations corresponding to the elements ranked in top m (m is a positive integer) according to the existence scores be the annotations to be added into the given medium file.

As for a case where there are plural initial annotations, it is possible to totalize $s^*$ of each of the candidate annotations in the candidate annotation lists corresponding to the initial annotations so as to obtain combined existence scores, then rank the combined existence scores corresponding to the candidate annotation lists, and then let one or more candidate annotation lists ranked in top m (m is a positive integer) be the final annotation lists to be added into the given medium file.

Although operations among the respective modules are performed in the above-mentioned order, an order of the steps of the annotation addition method according to the embodiments of the present invention is not limited to the above-mentioned order, i.e., it is possible to adjust the above-mentioned order based on actual demand. Furthermore there is no anteroposterior relationship among some steps, for example, the step of extracting the sense-of-vision features from the input medium file, the step of acquiring the candidate annotations based on the initial annotations and the coexistence coefficients of any two annotations in the training samples, etc. And some steps may be performed at the same time. In particular, for example, as for the following steps, i.e., the step of creating the annotation detection models based on the training samples formed by one or more existing media files having one or more annotations, the step of extracting the coexistence coefficients of any two annotations based on the appearance frequencies of the annotations in the training samples, the step of extracting the sense-of-vision features from the input medium file, and the step of acquiring the initial annotations from the input medium file, there is no anteroposterior relationship among these steps, and these steps may be performed at the same time; this cannot adversely influence the effect of the present invention.

In addition, it should be noted that the embodiments of the present invention may be executed by various approaches such as a whole hardware approach, a whole software approach, or a combination of them. For example, in some embodiments of the present invention, software such as firmware, built-in software, micro-code, etc. may be used; however, the embodiments of the present invention are not limited to this. Furthermore the embodiments of the present invention may be realized by a computer program according to the annotation addition method of the embodiments of the present invention; the computer program can be executed by a computer or any instruction execution system. The computer program may be stored in a machine-readable medium such as a semiconductor or solid memory, a magnetic tape, a loadable disk, an un-installable computer magnetic disk, a random access memory (RAM), a read-only memory (ROM), a hard disk, a floppy disk, etc.

While the present invention is described with reference to the specific embodiments chosen for purpose of illustration, it should be apparent that the present invention is not limited to these embodiments, but numerous modifications could be made thereto by those skilled in the art without departing from the basic concept and scope of the present invention.

The present application is based on Chinese Priority Patent Application No. 20101027016.0 filed on Mar. 18, 2010, the entire contents of which are hereby incorporated by reference.

What is claimed is:

1. An annotation addition method of adding one or more annotations into an input medium file, comprising:
   an annotation detection model creation step of creating one or more annotation detection models based on one or more training samples formed by one or more existing media files having one or more annotations;
   an annotation coexistence coefficient extraction step of extracting one or more coexistence coefficients of any two annotations based on appearance frequencies of the annotations in the training samples;
   a medium file input step of inputting the input medium file;
   a sense-of-vision feature extraction step of extracting one or more sense-of-vision features from the input medium file, the sense of vision features which are extracted include a low level feature including at least a Fourier description of the input medium file, and a high level feature including at least a creation environment of the input medium file;
   an initial annotation obtaining step of obtaining one or more initial annotations of the input medium file;
   a candidate annotation acquiring step of acquiring one or more candidate annotations based on the initial annotations and the coexistence coefficients of the annotations in the training samples, wherein the candidate annotation acquiring step includes:
      determining, for each of the one or more training samples, coexistence frequencies of any two annotations in a same one of the one or more existing media files;
      calculating a number of the existing media files which include at least one of the annotation; and
      acquiring annotation coexistence coefficients of any two annotations, based on the number of the existing media files which has been calculated; and
   a final annotation set selection step of selecting a final annotation set suitable for describing content of the input medium file from the candidate annotations based on the sense-of-vision features of the input medium file and the coexistence coefficients by using the annotation detection models.

2. The annotation addition method according to claim 1, wherein, the annotation detection model creation step comprises:
   a step of forming an annotation dictionary based on the training samples, then collecting one or more training samples belonging to the respective annotations in the annotation dictionary, and then extracting one or more sense-of-vision features of the collected training samples; and
   a step of creating the annotation detection models with regard to the annotations in the annotation dictionary based on the collected training samples and the sense-of-vision features of the training samples, wherein, each of the created annotation detection models gives existence probability of the corresponding annotation in one of the existing media files.

3. The annotation addition method according to claim 1, wherein, the annotation coexistence coefficient extraction step comprises:
   a step of calculating, with regard to all the training samples, the number of any two annotations existing in the same existing medium file so as to determine coexistence frequencies of any two annotations;
   a step of calculating, with regard to all the training samples, the number of the existing media files including the two annotations or one of the two annotations, or the number of the existing media files including one of the two annotations; and
   a step of, based on the calculated amounts of the existing media files, acquiring the annotation coexistence coefficients of any two annotations.

4. The annotation addition method according to claim 1, wherein, the initial annotation obtaining step is achieved by carrying out one of steps of:
   letting a user voluntarily input the initial annotations;
   automatically extracting one or more annotations carried by the input medium file itself;
   automatically extracting other information carried by the input medium file itself and converting it into an annotation format; and
   utilizing other information carried by the input medium file itself so as to acquire the initial annotations from a third party.

5. The annotation addition method according to claim 1, wherein, the sense-of-vision feature extraction step further comprises:
   extracting low level features including color, texture, and edge directions of the input medium file; and
   extracting a high level feature including creation time of the input medium file.

6. The annotation addition method according to claim 1, wherein, the final annotation set selection step comprises:
   a step of acquiring, based on the created annotation detection models, degrees of confidence of existence of the respective candidate annotations with regard to the input medium file;

a step of acquiring, based on the coexistence coefficients of the candidate annotations, a coexistence coefficient matrix of the candidate annotations, wherein, the dimensions of the coexistence coefficient matrix are equal to the number of the candidate annotations;

a step of calculating, based on the degrees of confidence of existence of the candidate annotations and the coexistence coefficient matrix of the candidate annotations, existence scores of the respective candidate annotations with regard to the input medium file, wherein, the higher the existence score is, the more accurately the corresponding candidate annotation describes the content of the input medium file;

a step of ranking, based on the existence scores of the respective candidate annotations, the existence scores of the respective candidate annotations; and a step of selecting, based on the ranked result, one or more candidate annotations suitable for describing the content of the input medium file to form the final annotation set.

7. The annotation addition method according to claim 1, wherein, in a case where the number of the initial annotations is plural, the candidate annotation acquiring step comprises:

a step of acquiring candidate annotation lists corresponding to the respective initial annotations; and a step of selecting one or more final candidate annotation lists able to describe the content of the input medium file from the candidate annotation lists, including:

a step of acquiring, by using the annotation detection models, a degree of confidence of existence of each of the candidate annotations in each of the candidate annotation lists with regard to the input medium file;

a step of acquiring, based on coexistence coefficients of the candidate annotations in each of the candidate annotation lists, a coexistence coefficient matrix of the candidate annotations in the corresponding candidate annotation list, wherein, the dimensions of the coexistence coefficient matrix are equal to the number of the candidate annotations in the corresponding candidate annotation list;

a step of calculating, based on the degree of confidence of existence of each of the candidate annotations in the corresponding candidate annotation list and the coexistence coefficient matrix of the candidate annotations in the corresponding candidate annotation list, existence scores of the respective annotations in the corresponding candidate annotation list with regard to the input medium file, and then, by totaling the existence scores of the respective annotations in the corresponding candidate annotation list with regard to the input medium file, acquiring a combined existence score of the corresponding candidate annotation list, wherein, the higher the combined existence score is, the more accurately the corresponding candidate annotation list describes the content of the input medium file;

a step of ranking, based on each of the combined existence scores of the candidate annotation lists, the combined existence scores of the candidate annotation lists; and a step of selecting, based on the ranked result, one or more final candidate annotation lists able to describe the content of the input medium file.

8. An annotation addition system for adding one or more annotations into an input medium file, comprising:

an annotation detection model creation module configured to create one or more annotation detection models based on one or more training samples formed by one or more existing media files having one or more annotations;

an annotation coexistence coefficient extraction module configured to extract one or more coexistence coefficients of any two annotations based on appearance frequencies of the annotations in the training samples;

a medium file input module configured to input the input medium file;

a sense-of-vision feature extraction module configured to extract one or more sense-of-vision features from the input medium file, the sense of vision features which are extracted include a low level feature including at least a Fourier description of the input medium file, and a high level feature including at least a creation environment of the input medium file;

an initial annotation obtaining module configured to obtain one or more initial annotations of the input medium file;

a candidate annotation acquiring module configured to acquire one or more candidate annotations based on the initial annotations and the coexistence coefficients of the annotations in the training samples, wherein the candidate annotation acquiring module performs:

determining, for each of the one or more training samples, coexistence frequencies of any two annotations in a same one of the one or more existing media files;

calculating a number of the existing media files which include at least one of the annotations; and acquiring annotation coexistence coefficients of any two annotations, based on the number of the existing media files which has been calculated; and a final annotation set selection module configured to select a final annotation set suitable for describing content of the input medium file from the candidate annotations based on the sense-of-vision features of the input medium file and the coexistence coefficients by using the annotation detection models, wherein each of the modules comprises at least one of hardware, and a combination of hardware and software.

9. The annotation addition system according to claim 8, wherein, the final annotation set selection module comprises:

a module configured to acquire, by using the created annotation detection models, degrees of confidence of existence of the respective candidate annotations with regard to the input medium file;

a module configured to acquire, based on the coexistence coefficients of the candidate annotations, a coexistence coefficient matrix of the candidate annotations, wherein, the dimensions of the coexistence coefficient matrix are equal to the number of the candidate annotations;

a module configure to calculate, based on the degrees of confidence of existence of the candidate annotations and the coexistence coefficient matrix of the candidate annotations, existence scores of the respective candidate annotations with regard to the input medium file, wherein, the higher the existence score is, the more accurately the corresponding candidate annotation describes the content of the input medium file;

a module configured to rank, based on the existence scores of the respective candidate annotations, the existence scores of the candidate annotations; and a module configured to select, based on the ranked result, one or more candidate annotations suitable for describing the content of the input medium file to form the final annotation set.

10. The annotation addition system according to claim 8, wherein, in a case where the number of the initial annotations is plural, the candidate annotation acquiring module comprises:

a module configured to acquire candidate annotation lists corresponding to the respective initial annotations; and a module configured to select one or more final candidate annotation lists able to describe the content of the input medium file from the candidate annotation lists, including:

a module configured to acquire, by using the annotation detection models, a degree of confidence of existence of each of the candidate annotations in each of the candidate annotation lists with regard to the input medium file;

a module configured to acquire, based on coexistence coefficients of the candidate annotations in each of the candidate annotation lists, a coexistence coefficient matrix of the candidate annotations in the corresponding candidate annotation list, wherein, the dimensions of the coexistence coefficient matrix are equal to the number of the candidate annotations in the corresponding candidate annotation list;

a module configured to calculate, based on the degree of confidence of existence of each of the candidate annotations in the corresponding candidate annotation list and the coexistence coefficient matrix of the candidate annotations in the corresponding candidate annotation list, existence scores of the respective annotations in the corresponding candidate annotation list with regard to the input medium file, and then, by totaling the existence scores of the annotations in the corresponding candidate annotation list with regard to the input medium file, acquire a combined existence score of the corresponding candidate annotation list, wherein, the higher the combined existence score is, the more accurately the corresponding candidate annotation list describes the content of the input medium file;

a module configured to rank, based on the combined existence scores of the respective candidate annotation lists, the combined existence scores of the candidate annotation lists;

and a module configured to select, based on the ranked result, one or more final candidate annotation lists able to describe the content of the input medium file.

11. A non-transitory machine-readable medium having machine-executable instructions for execution by a processing system, wherein, the machine-executable instructions are used for adding one or more annotations into an input medium file, and the machine-executable instructions, when executed, cause the processing system to carry out:

an annotation detection model creation step of creating one or more annotation detection models based on one or more training samples formed by one or more existing media files having one or more annotations;

an annotation coexistence coefficient extraction step of extracting one or more coexistence coefficients of any two annotations based on appearance frequencies of the annotations in the training samples;

a medium file input step of inputting the input medium file;

a sense-of-vision feature extraction step of extracting one or more sense-of-vision features from the input medium file, the sense of vision features which are extracted include a low level feature including at least a Fourier description of the input medium file, and a high level feature including at least a creation environment of the input medium file;

an initial annotation obtaining step of obtaining one or more initial annotations of the input medium file;

a candidate annotation acquiring step of acquiring one or more candidate annotations based on the initial annotations and the coexistence coefficients of the annotations in the training samples, wherein the candidate annotation acquiring step includes:

determining, for each of the one or more training samples, coexistence frequencies of any two annotations in a same one of the one or more existing media files;

calculating a number of the existing media files which include at least one of the annotations; and acquiring annotation coexistence coefficients of any two annotations, based on the number of the existing media files which has been calculated; and a final annotation set selection step of selecting a final annotation set suitable for describing content of the input medium file from the candidate annotations based on the sense-of-vision features of the input medium file and the coexistence coefficients by using the annotation detection models.

* * * * *